US008520986B2

(12) United States Patent
Dailey

(10) Patent No.: US 8,520,986 B2
(45) Date of Patent: Aug. 27, 2013

(54) USE OF FIBER OPTIC SENSOR TECHNIQUES FOR MONITORING AND DIAGNOSTICS OF LARGE AC GENERATORS

(76) Inventor: George Franklin Dailey, Pittsburgh, PA (US)

( * ) Notice: Subject to any disclaimer, the term of this patent is extended or adjusted under 35 U.S.C. 154(b) by 47 days.

(21) Appl. No.: 13/065,842

(22) Filed: Mar. 31, 2011

(65) Prior Publication Data

US 2012/0026482 A1   Feb. 2, 2012

Related U.S. Application Data

(60) Provisional application No. 61/341,794, filed on Apr. 5, 2010.

(51) Int. Cl.
| | |
|---|---|
| *G02B 6/00* | (2006.01) |
| *H04J 14/02* | (2006.01) |
| *G01R 13/30* | (2006.01) |
| *G01D 7/00* | (2006.01) |

(52) U.S. Cl.
USPC ............... 385/12; 385/37; 385/100; 398/79; 73/1.45; 250/227.11

(58) Field of Classification Search
USPC ............ 385/12, 13, 37, 100, 122, 123, 128, 385/6, 8, 1, 2, 3; 398/79, 84, 87; 73/1.45, 73/25.01; 250/227.11, 227.14, 227.18, 227.19; 318/490; 356/43
See application file for complete search history.

(56) References Cited

U.S. PATENT DOCUMENTS

| | | | |
|---|---|---|---|
| 4,449,396 A | 5/1984 | Bzdula | |
| 5,308,973 A | 5/1994 | Odoni et al. | |
| 5,945,665 A * | 8/1999 | Hay | 250/227.14 |
| 6,337,737 B1 | 1/2002 | Chang et al. | |
| 6,344,743 B1 | 2/2002 | Holmes et al. | |
| 7,379,632 B1 * | 5/2008 | Twerdochlib | 385/13 |
| 8,076,909 B2 * | 12/2011 | Diatzikis et al. | 322/99 |
| 8,098,967 B1 * | 1/2012 | Bazzone | 385/12 |
| 2007/0116402 A1 | 5/2007 | Slade et al. | |
| 2008/0036336 A1 * | 2/2008 | Salem et al. | 310/68 B |
| 2009/0087303 A1 * | 4/2009 | Ruggiero et al. | 415/118 |
| 2011/0002795 A1 * | 1/2011 | Brookbank | 417/63 |
| 2011/0018483 A1 * | 1/2011 | Koste et al. | 318/490 |

* cited by examiner

*Primary Examiner* — Ryan Lepisto
*Assistant Examiner* — Erin Chiem
(74) *Attorney, Agent, or Firm* — James Ray & Assoc

(57) ABSTRACT

A method for monitoring the operating conditions of an electric generator for mechanical strain and temperature includes means of distributive fiber optic sensors based on both Rayleigh back scattering techniques and Brillouin frequency shift fiber optic sensor analysis as both Rayleigh and Brillouin scans and allow accurate strain and temperature determinations at all points along standard fiber optic cables of considerable length, which effectively yields thousands of sensors throughout the entire standard fiber optic cable. Raman distributive temperature sensing also has a limited application. Single mode and polarizing maintaining fibers can both be analyzed and read with any Rayleigh or Brillouin distributive fiber optic sensor laser system allowing great flexibility in sensor spatial resolution, total sensed length, resolution and other factors. A sealed fiber collection box located outside the electric generator permits enhanced reliability and reconfiguration into any number of desirable fiber layouts necessary for specific static and dynamic measurements.

40 Claims, 7 Drawing Sheets

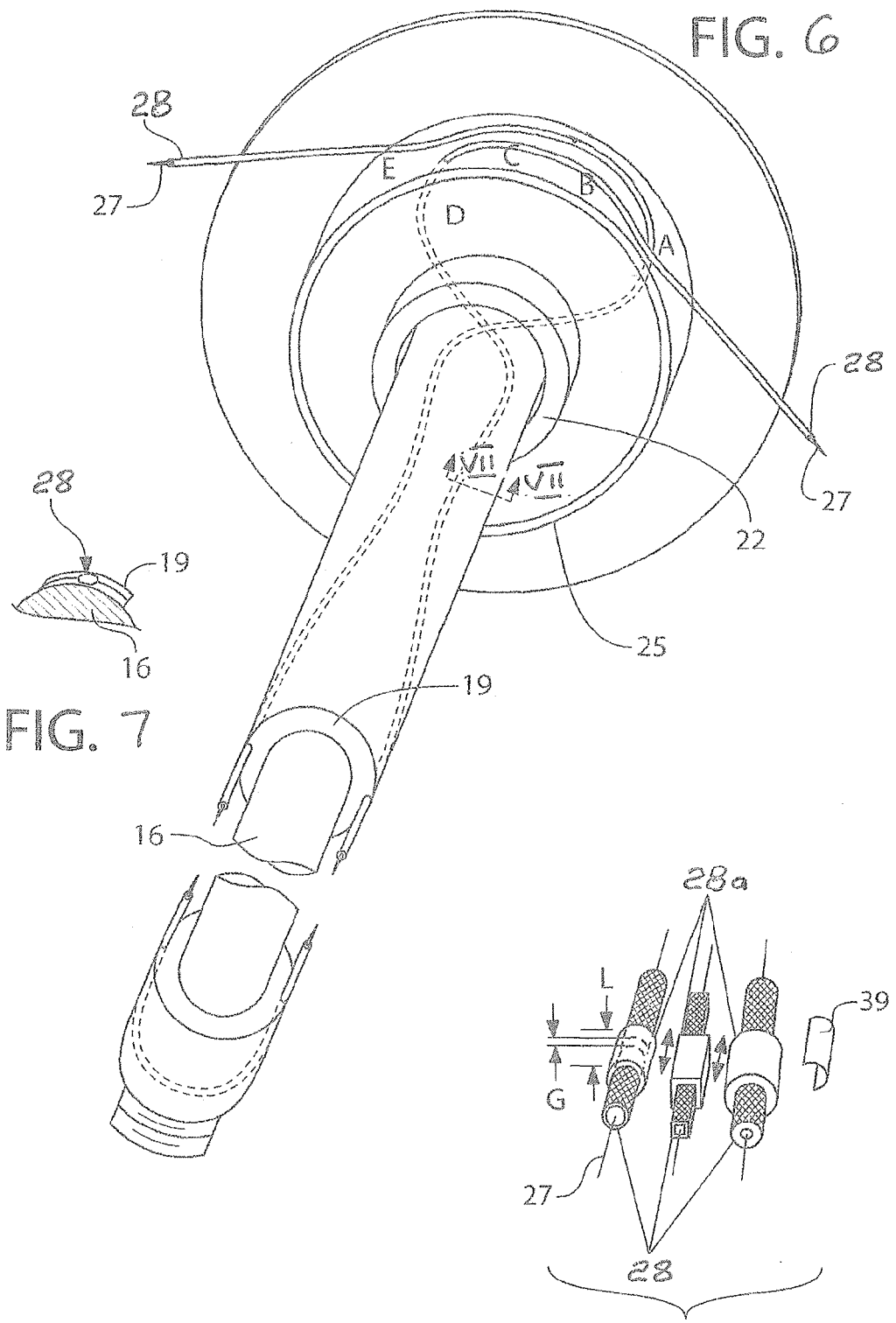

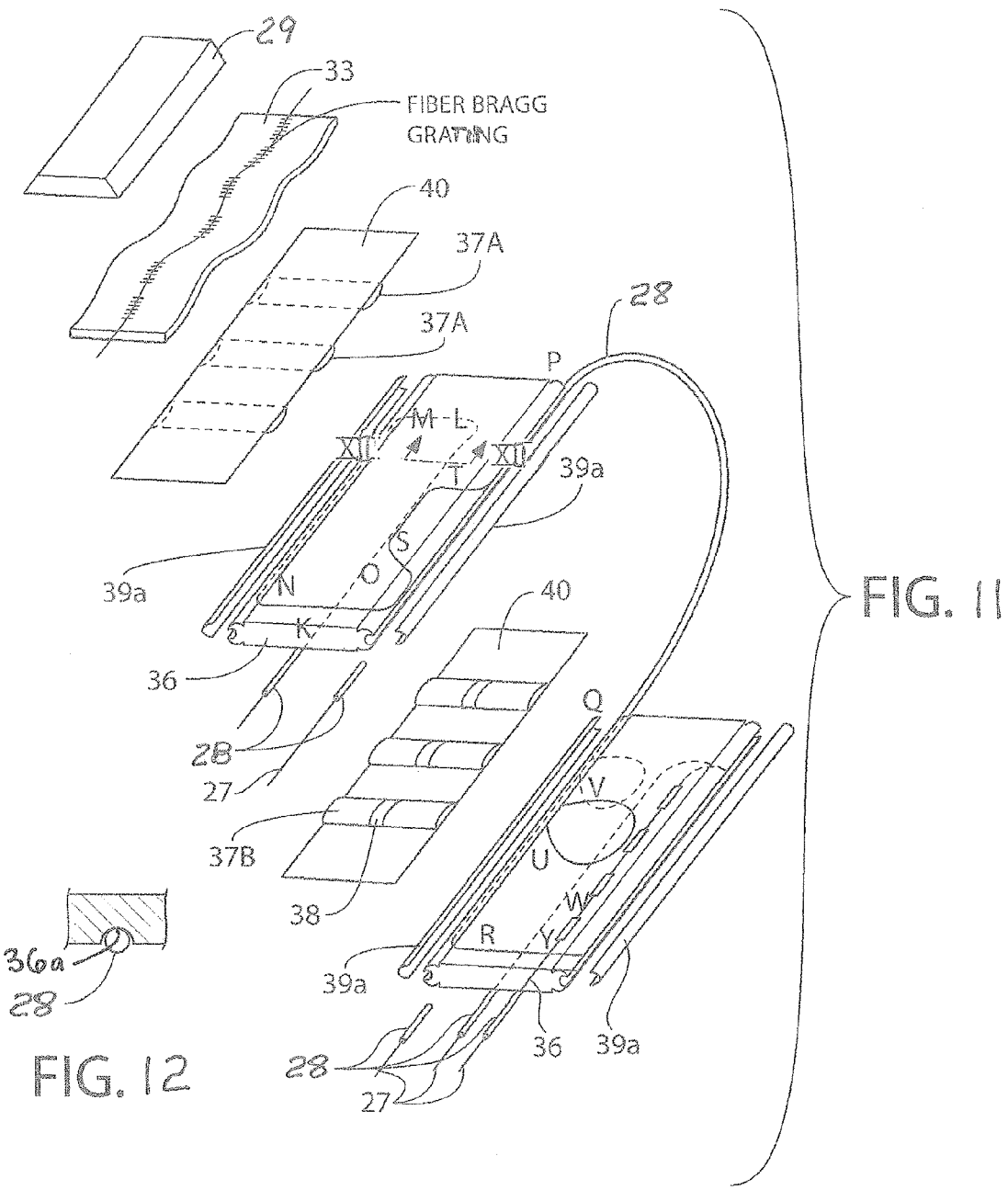

USE OF FIBER OPTIC SENSOR TECHNIQUES FOR MONITORING AND DIAGNOSTICS OF LARGE AC GENERATORS

CROSS REFERENCE TO RELATED APPLICATIONS

This application claims the benefit under 35 U.S.C. 119 (e) of U.S. Provisional Application No. 61/341,794 filed Apr. 5, 2010.

FIELD OF THE INVENTION

This invention relates generally to the monitoring of an electrical machine, specifically to a method and system for monitoring the magnetic stator core and portion of the windings within the magnetic stator core by means of distributed fiber optic sensor measurements through a collection of fiber optic cables in order to monitor the stator core and the electrical windings within and extending from the stator core.

BACKGROUND OF THE INVENTION

An electrical generator used in the field of electric power generation includes a stator core formed by an overlapping stack of thin electrical grade sheets of iron (laminations) which are coated with suitable insulation to electrically insulate each lamination from contiguous laminations. These laminations when properly stacked and aligned are then clamped together under high compression and so arranged to form a series of equally spaced, uniform stator slots. The clamping force may be provided by a series of through bolts and building bolts equally spaced and extending through a series of equally spaced holes located at the mean radius and a second set of equally spaced semi-circular arcs at the outer diameter. The holes at the mean radius contain long stainless steel and electrically insulated bolts, appropriately called through bolts. The bolts on the outer diameter are usually not insulated, but are in some designs, and are referred to as building bolts. Some manufacturers do not ground the stator core and, therefore, the outer clamping members may be insulated as well. The clamped stator core slots contain close fitting, well confined electrical windings consisting of a wound series of bottom coils and top coils, which is referred to as the winding.

The inter-laminar resistance of all the electrical steel stator laminations is measured approximately every five years by the EL-CID (electromotive core imperfection detector) maintenance test. This test requires a temporary loop of wire to be drawn through the air-gap between the stator and non-rotating rotor. The machine must be off-line for the test. The core is then excited at 60 Hz and a coil of wire (test coil) is pulled through the air gap along the inside diameter of the stator core, which is commonly referred to as the tooth top. By means of a test coil and a reference coil, the inter-laminar resistance of each lamination is then evaluated by electronic means that compares the amplitude and phase shift between the EL-CID test coil and the reference coil. This test is very effective at locating electrical shorts between adjacent laminations except for the non grounded stator cores. In that case a lamination would have to have two shorts within its expanse for the EL-CID to detect a problem. With a grounded core a single short can be detected. A second method to evaluate stator core inter-laminar resistance is to remove the rotor, install a very heavy current carrying member at the geometric center, apply a heavy 60 Hz current to this center conductor, which encircles the entire machine, and then energize the conductor in order to excite the core to full magnetic excitation, and finally look for "hot spots" with an infrared imaging device. When a hot spot is found with either method, the inter-laminar clamping force is reduced and wedges are used to separate the shorted laminations enabling mica insulation to be placed between the shorted laminations thereby restoring stator core electrical insulation integrity. Unfortunately, the long time between stator core integrity tests has resulted in too much insulation degradation between inspections with the inevitable core failure, which then requires stripping the winding from the core, a full or partial restack of the stator laminations, followed with a complete rewind of the electrical machine. There is one monitor that is used on hydrogen cooled machines, called a core monitor, which is designed to detect ions given off to the hydrogen gas when the core overheats and throws these ions into the hydrogen cooling gas. However, many areas are not directly exposed to the hydrogen gas, such as the stator coil slot area between radial vents. Also, some units are cooled only with axial vent holes and have no radial vents. This creates a sealed area around all the stator coils within the stator core making ion release from these areas very limited. The core monitor needs to be quite sensitive to be effective and many times it will give a "false alarm." In some situations, the core monitor will signal a problem, the operator will shut down the machine, open a cover and crawl inside and inspect what is visible. If nothing is visibly overheated or obviously burned, they usually return the unit to service, risking an eventual stator core failure that was there but hidden from view. Other times the machine continues running and the problem is found during the maintenance inspection described above. If stator core alarms and subsequent crawl through inspections fail to isolate the cause, many operators will simply turn off the core monitor and take the risk of an eventual stator core failure.

Another maintenance check that is always done in parallel with the EL-CID is stator core inter-laminar tightness, which involves measuring the residual tension in the through bolts and building bolts. This is done by means of hydraulic torque wrenches or a hydraulic bolt tensioning tool. If the stator core laminations are not sufficiently tight, the magnetic forces will cause stator lamination tooth tops or vent fingers, which are the mechanical spacers in the radial vents, to vibrate. This vibration has in many instances caused pieces of laminations and vent fingers to break off, becoming loose parts, and, as a direct consequence, cause a short to ground within the core. This happens because cooling gas windage in conjunction with the magnetic forces can cause these loose pieces to vibrate and wear through the stator coil electrical stator coil ground-wall insulation, creating the short to ground and possibly significant core damage before the relays and breakers can trip the unit off line.

Stator coil wedge tightness is another maintenance check that is performed in parallel with EL-CID and stator core inter-laminar tightness. It is important to maintain stator coil tightness at a level that prevents any relative movement within any portion of the stator slot. Stator coil movement is often referred to as slot pounding, which can quickly abrade the stator coil electrical ground-wall insulation leading to a short to ground once the stator coil ground-wall insulation gets too thin or cracks through due to the pounding. The tightness of the stator coils is ascertained by one of two methods. If the rotor is removed, the technician taps on all of the stator coil wedges and listens for "hollow" sounds. If the rotor is installed, a robotic device is driven down the air gap and a small hammer taps on each wedge and the resulting vibration is recorded. Above a certain level of vibration, the wedge is considered loose. If more than five consecutive wedges in a line are all considered loose, they have to be retightened, i.e., re-wedged. If these wedges are inboard, outboard wedges must also be removed to obtain access to the loose inboard wedges. The goal of the maintenance effort is to maintain the compressive state between the stator coils and the stator core slot surfaces from one maintenance interval to the next. If a sufficient number and pattern of wedges are loose, a complete re-wedge of the entire electrical machine is required. Also, a stator core wedge can be tight on one end of the wedge and loose at the other end of this same wedge in which case the wedge is judged to be loose. It should also be noted that if a condition of stator coil vibration has been achieved as disclosed in Patent Application Publication US 2008/0036336 A1, stator coil electrically insulating ground-wall insulation has already been seriously compromised. The purpose of the stator wedge tapping test is to ascertain that the wedges are sufficiently tight to prevent any relative motion (vibration) between the stator core slots and the stator coils contained within these slots. Continuous wedge/coil tightness is required for all sections of the stator coils within the stator core not just the sections of stator coil at the ends of the slots as noted in U.S. patent application Ser. No. 12/209,333. Slot end stator coil vibration is undesirable but stator coil vibration within the great bulk of the stator core is also equally undesirable and is currently measured only by performing electrical generator partial disassembly and using the robotic wedge tap device approximately every five years. If additional fiber Bragg gratings were used according to the method of U.S. patent application Ser. No. 12/209,333 a fiber Bragg grating would be required for each ripple peak and valley as shown in FIG. 6 (six total per ripple spring) in order to measure the stator coil local tightness due to a single ripple spring, which is the measurement currently performed by the robotic wedge tapping device. With over 1000 top ripple springs in a single machine and six (6) optical fiber Bragg gratings required per top ripple spring as shown in FIG. 6, the complete ripple spring-by-ripple spring stator coil tightness evaluation by means of individual fiber Bragg gratings would be a cumbersome process. That limitation along with the impracticality of trying to link fibers between adjacent top ripple springs as these ripple springs are assembled by wedging and hammering them to a nearly flat condition would require a separate fiber for each top ripple spring, which is too many fibers to consider as a solution. The top ripple springs are also highly stressed thin (0.8 mm) components subject to cracking which makes cutting grooves into the ripple springs and bonding in fiber Bragg gratings a questionable practice. For all of the above enumerated limitations, the invention herein described is proposed.

An addition to the optical sensing capabilities noted in U.S. patent application Ser. No. 12/209,333, the invention herein describes a method to fully measure the operating temperatures of all electrical connections and winding segments within the electric generator. This is needed in order to augment the vibration data mentioned in U.S. patent application Ser. No. 12/209,333 as a critical electrical connector may start to overheat without significant vibratory change just as an electrical connector might change vibration without a corresponding temperature change. Both data sets, vibration and temperature, are fully required to fully diagnose the electric generator operating parameters and for the entire winding to be adequately protected.

As noted in the Patent Application US 2008/0036336 A1 and U.S. patent application Ser. No. 12/209,333, a distributive fiber optic sensing system is the appropriate system to use considering the high voltages found within the electrical generating machine and the grounding/arcing potential associated with electrically conducting or magnetic materials, such as metallic wires, conduits, and fixtures. The distributive fiber optic systems currently available consist of dense-packed Fiber Bragg gratings, Rayleigh and Ramon back-scattering temperature sensors, and the Brillouin sensors. The Brillouin is further divided into BOTDA, BOTDR, and DPP-DA/Brillouin. These different versions of Brillouin can all measure strain and temperature, some simultaneously, some not. For the purposes of this invention, they are all referred to as Brillouin frequency shift with the understanding that that terminology does not distinguish between the different versions, which is immaterial for the purposes of this invention. Within this collection, the Ramon is primarily for distributive temperature sensing only, whereas the others can quantify both temperature and mechanical strain, when compensation for the combined effect on the sensing fiber optical element(s) due to both temperature and mechanical strain is correctly considered in the construction of the fiber optical element(s). The Raman distributive temperature sensing method is also unique in its utilization of multi-mode fibers, the others primarily employ single mode and/or polarizing maintaining standard optical fibers.

SUMMARY OF THE INVENTION

The invention described herein enables the operator of an electric generator to monitor the condition of the stator core and winding portion within the generator stator core. A second feature of the invention enables the operator to monitor the temperature of all electric connectors, such as phase connections, series connections, main lead connections, i.e., all the mechanical connectors which are always found beyond the region of the stator core. The winding itself between these connections can also be monitored for temperature and mechanical strain. All measurements within the scope of this invention are to be made with distributed fiber optic sensors, which can be a series of Fiber Bragg gratings, Rayleigh backscattering sensors and/or Brillouin frequency shift sensors, the selection of the appropriate method, where it possible to specify, is enumerated herein. It must be noted that the Fiber Bragg grating with wave length multiplexing would only be considered for the stator core tightness measurement. All other measurements would be done with either the Rayleigh back-scattering or the Brillouin frequency shift analysis. A special application of Ramon temperature fiber optic back-scattering sensing is also proposed. All fiber optic sensors and the fiber optic cables associated with said sensors are designed and of sufficient sensing length to exit through the machine frame and be gathered as a grouping into a small sealed box (with removable cover), hereafter referred to as the "fiber box", located appropriately on the outside of the machine, where all optical fibers can then be grouped and connected to the appropriate fiber optic sensor analyzer, whether it be for dense packed Fiber Bragg Grating cable(s), Rayleigh back-scattering sensing cable(s), Brillouin frequency shift sensing cable(s), or Raman distributive temperature sensing cable(s). Furthermore, the various fiber optic sensor laser analyzers may be intermittently connected as needed to the appropriate fiber optic cable located within the fiber box, or they may connect to a standoff fiber optic cable that enables the fiber optic sensor laser analyzer to be located in the control room of electric generator. Whether measured at the generator, in the control room, or via the internet to a remote site, fiber run configurations within the generator can be changed and reconfigured within the temporarily open but also sealable fiber box. This reconfiguration is necessary to take advantage of different spatial resolutions and variations in dynamic and static capabilities in association with different Rayleigh, Brillouin, or Raman distributive fiber optic sensor laser systems that might be employed as needed. Wherever, the various fiber optic sensor analyzers are located, the choice of intermittent vs. continuous "on-line" fiber optic sensor measurement and analysis would then be decided as needed, based both on machine history in the case of a retrofit of various fiber optic sensor options and/or on the amount of protection desired for the particular electric generator. For example, a large electric generator as might be found at a nuclear plant might be best served by continuous "on-line" fiber optic sensor measurement in view of the enormous economic consequences of a forced outage, which might necessitate all the options described herein in addition to those made available and fully described in U.S. patent application Ser. No. 12/209,333, as the fiber optic sensor invention described herein is a direct augmentation to the capabilities of that U.S. patent.

Detailed descriptions and specifications for the various fiber optic distributive sensing systems are found in the following:

1.) Wave Division Multiplexed FBG's, which are the subject of U.S. patent application Ser. No. 12/209,333) are described at www.MicronOptics.com. Click on "Sensing", "MicronOptics, User Guide Revision 1.110", and Frequently Asked Questions.

2.) Time Division Multiplexed FBG's, are described at www.lunainnovations.com. Click on "Products", "Fiber Sensing", and "Rayleigh Sensing".

3.) "Brillouin Frequency Shift Distributive fiber Optic Sensing, BOTDA/BOTDR" is described at www.OzOptics.com and in U.S. Pat. Nos. 7,499,151 and 7,599,047.

4.) "High-Spatial-Resolution Time—Domain Simultaneous Strain and Temperature Sensor Using Brillouin Scattering and Birefringence in a Polarization-Maintaining Fiber", "DPP-DA/Brillouin grating", by Yongkang Dong, Liang Chen, and Xiaoyi Bao, Senior Member IEEE, IEEE Photonics Technology Letters, Vol. 22, No. 18, Sep. 15, 2010. The authors are with the Department of Physics, Ottawa, Ontario, Canada.

5.) http://www.Sensortran.com/Technolgy-dtsbasics.php fully describes Raman distributive temperature fiber optic sensing.

All of the above distributed fiber optic sensing technologies are selectable options for the invention herein described. To describe the mathematical details of each method would be beyond the scope of this invention. For example, there are at least four distinct versions or the Brillouin distributive fiber optic sensor system all of which are potential candidates. Some use single mode fiber, others polarizing maintaining fiber. All have different algorithms for separating mechanical strain from temperature. The same variations occur for the Rayleigh back-scattering method and the Raman temperature sensing technologies as well. It is important to note that the selection of one version over another does not alter the essential features and intent of this invention.

First considering the requirement to maintain sufficient stator core electrical steel inter-laminar pressure and the means required to measure such pressure, a fiber optic distributed load cell is proposed as a means to eliminate the need to measure such pressure with hydraulic means consisting of hydraulic torque wrenches or hydraulic tensioning devices. If, for example, the fiber optic distributed load cell is selected as the only part of this invention needed, for reasons beyond the scope of this patent application, then the logical choice of fiber optic sensors would be the wave modulated distributive fiber Bragg grating. Conversely, if additional parts of the invention are selected such as the measurements associated with the tightness of each and every stator wedge or the electrical resistance of each electrical steel stator core lamination, then the Rayleigh distributive fiber optic sensor would be required. In that situation, the Rayleigh distributive fiber optic sensor would be used to quantify the mechanical clamping forces applied by the building bolt and through bolt clamping means so that a common distributive fiber optic sensor laser analyzer could be used for all measurements associated with the integrity of the stator core. In addition, the Rayleigh distributive fiber optic sensor could be used to measure all electrical connection temperatures within the winding as an augmentation to the vibratory measurements enumerated in U.S. patent application Ser. No. 12/209,333. The Rayleigh distributive fiber optic system is not currently capable of vibratory analysis, but that additional capability is under development by Luna Innovations of Blacksburg, Va. The location of the distributive fiber optic sensor laser analyzer would ideally be located in the control room of the electric generator. The distance between the electric generator and the control room varies from plant to plant and there can be up to 100 yards separating the electric generator and its control room. Since the Rayleigh distributive fiber optic sensor system proposed by Luna Innovations has a maximum fiber length of 70 meters and their "standoff" i.e., fiber optic link concept has not yet been tested. This implies that in the general case the distributive fiber optic sensor laser analyzer could not always be located in the control room. (Other Rayleigh fiber optic sensors systems have a reach in the 2 kilometer range but these have larger numbers for the minimum spatial resolutions and are, therefore, not suitable for the top ripple spring measurement associated with stator coil tightness.) Therefore, for this option the distributive fiber optic laser analyzer would, of possible necessity, be located near the side of the generator within an environmentally controlled chamber. This would only be for the condition where continuous or semi-continuous measurements are required. All the other options with the possible exception of the Luna Rayleigh method would permit the distributive fiber optic sensor laser analyzer to be located in the electric generator control room.

Before continuing with additional information concerning the selection of the appropriate distribute fiber optic sensor system, it is important to note that one embodiment of the invention utilizes the birefringence properties of a polarizing maintaining fiber. In one version of the Brillouin, it is the property of birefringence that allows the simultaneous determination of temperature and strain from a single fiber. Birefringence in optic fiber can be generated by applying transverse pressure to the fiber, i.e., pressure loads in a generally perpendicular manner to the centerline of the fiber. Since the property of birefringence is utilized in this temperature strain separation it is highly important the mechanical design and function of the distributive fiber optic sensor not alter the natural birefringence of the polarizing maintaining fiber. For this reason use of this method requires special measures so as to not introduce birefringence which would be produced by transverse loads (pressures) on the fiber at any region associated with the sensing region. A second preferred embodiment is an application of the distributive fiber optic sensor means described in U.S. Pat. No. 7,599,047 which utilizes two distinct single mode fibers, each having a unique and different refractive index but with a common and connected light path. This refractive difference then enables the separation of mechanical strain and temperature using the algorithms enumerated in U.S. Pat. No. 7,599,047. The implication for this invention is that the distributive fiber optic cable, whether for temperature or strain, can be rigidly affixed (bonded) to the electric generator component, in this case, the thin fiberglass shim fillers used in all electric generators constructed to take up the gap tolerances which are necessary for the stator coil to fit into and be secured to the generator stator core slot. This version the two distinct fibers could be coated with a high temperature plastic such as PEEK and then bonded to various generator components in order to measure both strain and temperature. Using this version of the Brillouin would enable measurement of stator coil top ripple compression, individual stator core electrical steel lamination temperatures, and stator coil temperatures within the entire slot portion, all with one rugged fiberglass shim with the distributive fiber optic sensor cables rigidly attached (bonded) into a series of small grooves. This important distinction is fully described in the "Detailed Description" Section. The essential features of the invention relative to the stator core and winding portions within said stator core are that modifications are made to existing components essential to the construction and assembly of the electric generator stator core windings within the stator core that are such as to permit detailed monitoring of key strains and temperatures with addition of distributive fiber optic sensors which with other known data for these components, such as load deflection curves for the top coil ripple spring, can be used to predict the remaining life of the stator core and winding remaining life, and electrical steel inter-laminar resistance as well as the point at which stator coil looseness could be a problem. In the case of stator core electrical steel inter laminar electrical resistance, this evaluation can be done by simply periodically monitor the temperature of each of the thousands of steel laminations, and by monitoring the winding within the core by monitoring the stator coil temperature at every point within the full length of the stator core. Stator coil tightness is inferred by measuring the remaining compressive force associated with each of the thousands of top ripple springs and by comparing these distributive measured strains to known strain load curves for the top ripple springs. Over extended periods of electric generator operation, the holding force exerted by the top coil ripple springs inevitably drops off due to creep in the stator coil ground-wall insulation and creep within the copper stranded Roebling structure of the coil and this can be detected by direct measurement of the force exerted by each top coil ripple spring. The ripple springs are highly stressed and tend to have some internal creep as well; however the design of the fiberglass shim containing the distributive fiber optic sensors is stressed only in the elastic region and, therefore, is able to provide the force exerted by each top coil ripple spring. Some electric generator constructions do not use top ripple springs but they still use the fiberglass shims as fillers. The invention has application in this situation as well as the trending tightness of the stator coils within the stator core slots is totally measurable by means of the invention regardless of the presence or absence of top coil ripple springs. Finally there is a class of electric generators in which the entire stator core and associated windings are fully vacuum impregnated which fills all the small gaps and voids between the windings and the stator core slots thereby creating a homogeneous very rugged composite structure. However, these electric generators also usually have the non-grounded stator core so a single short between two continuous electrical steel stator laminations cannot be detected with EL-CID. Two shorts between these laminations would have to be present and separated by some distance for EL-CID to be able to detect the problem, but if two shorts are in proximity to one another they are undetectable by EL-CID with the floating core design, which places the stator core steel inter-laminar resistance as measured by EL-CID in the "false negative" category. Therefore, the invention applies for this class of machines as well as EL-CID is not effective and can not detect all the hot spots that could be present during operation in this floating core design, which makes the invention useful in this configuration of electric generator stator core.

Another aspect of the invention, a system for monitoring the operating condition of an electric generator consisting of a stator core, windings within the stator core portion, and a plurality of stator coil ends, turbine end and exciter end, both integral with the stator coil portions, and all the numerous electrical connections located in the turbine end and connector end, is a means to measure with a single distributive fiber optic cable all the mechanical strains and temperatures at any location along this distributive fiber optic cable. The distributive fiber optic cable would not use Fiber Bragg gratings as described in U.S. patent application Ser. No. 12/209,333 but would contain a polyimide coated single mode or polarizing maintaining fiber and would be simulated and controlled by a distributive fiber optic laser system employing either the Rayleigh method or one of the many Brillouin methods enumerated above. The feature of the invention for monitoring all the generator electrical connections, whether they be phase, series, parallel ring connectors, or main lead connectors is a high strength, high bending modulus, high temperature plastic tube, approximately a millimeter in diameter but not larger than 1.8 millimeters with a small central hole about one-half millimeter in diameter. Plastic couplings are used to join sections of this tubing together thereby enabling long sections up to hundreds of meters in total length to be easily assembled, which when assembled in the electric generator allow measurement of mechanical strain or temperature at every point along the entire length. This is possible by means of the couplings connecting sections of the tubing. If mechanical strain is desired, the distributive Rayleigh or Brillouin fiber would exit the tube and be bonded directly to the desired electric generator component for a short distance, the fiber would then reenter the tube for whatever desired distance, yielding temperature within those regions. The other possibility is to use the version of the Brillouin having different indices of refraction one for the strain fiber, a second fiber with a different index of refraction for the temperature fiber with the fibers fused together at the distal end. The two fibers then coated with a suitable high temperature, mechanically strong outer coating could then be used to monitor the end windings including the relevant mechanical electrical connectors. Of course, Rayleigh back-scattering could also be used with the coupling concept to expose sections of fiber that could be directly bonded to winding components and those sections of fiber within the tube would be analyzed for temperatures. An additional feature of this plastic tube containing the distributive fiber optic cable is that the open ends and the couplings can be sealed and pressure tested, which makes the system an ideal for the class of vacuum impregnated generators described above and a valuable augmentation to the fiber Bragg grating point sensors described in U.S. patent application Ser. No. 12/209,333. A Brillouin based "SMARTape" is advertized and sold by www.Omnisens.com. This is mainly for civil engineering applications and due to its construction as a tape it would not edge bend effectively and on a flat bend, the minimum bend radius of the Brillouin distributive fiber could be compromised resulting in breaking the fiber or excessive bend loss. Also, it is not known if the Brillouin fiber is sealed and, therefore, suitable for vacuum impregnation.

BRIEF DESCRIPTION OF THE DRAWINGS

FIG. 6 illustrates an AC electric generator through bolt including through bolt not, stainless steel washer, insulating washer, and composite support tube pattern for a fiber optic sensor, based on Rayleigh back-scattering, but not limited to that method as BOTDA could also be used;

FIG. 7 is a partial cross-sectional view of the composite fiber optic sensing support tube along lines VII-VII of FIG. 6;

FIG. 8 illustrates different shapes of the fiber optic sensing support tube having both circular and non-circular support tubes for the distributed fiber optic sensing fiber within the support tube(s);

FIG. 11 illustrates fiber optic sensor in combination with modified insulating stator core slot fillers of the AC electric generator for stain and temperature measurement of the stator core iron laminations and stator coils;

FIG. 12 is a partial cross-sectional view along lines XII-XII of FIG. 11, particularly illustrating the fiber optic sensor installed into a groove milled into a standard stator core slot filler material;

DETAILED DESCRIPTION OF THE INVENTION

The following inclusive description of the preferred embodiment is made with reference to the above listed drawings. It should be noted that the preferred embodiment is somewhat different for a new factory machine versus field rewound units or field units that undergo only a re-wedge (stator coil tightening procedure). Obviously, in each case the amount and location of fiber optic cable that can be installed is somewhat different but does not detract from the spirit and scope of the current invention.

Figure 1:
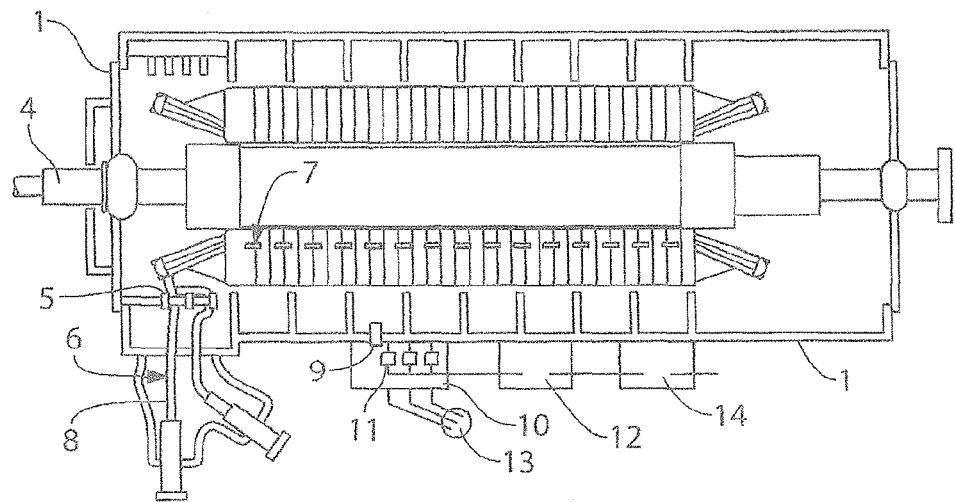
FIG. 1 illustrates a cross section of a typical electric AC generator.

FIG. 1 shows a typical AC electric generator including the frame 1 within which is contained the stator core 2, integral electrically conductive windings showing the end regions 3 and rotor 4. Also enumerated in FIG. 1 are the parallel rings 5 which are connected to the main leads (typically six(6)), referenced by numeral 6. Other key generator components are enumerated in subsequent figures. Attention is called to features of the invention described herein and further described below to wit:

A fully distributive fiber optic sensor single mode (SM), polarizing maintaining (PM) cable, or multi mode (MM) cable contained within the winding portion of the stator core 7.

1.) A fully distributive fiber optic SM/PM sensor cable for monitoring the end regions (only one end region shown) including all electrical connections among which typically would be found, series, phase, parallel ring, main lead connections, and flexible connectors 8. MM cable would only be used for temperature only measurements via the Raman back-scattering method.

2.) A gas-tight frame penetration 9 is required for hydrogen cooled generators to conduct all distributive fiber optic sensor cables through the generator frame 1.

3.) Outside the generator frame is a sealed distributive fiber optic sensor containment box, "fiber box", 10 (with removable cover) containing all the distributive fiber optic sensor cables required as well as a multiple mechanical fiber optic links 11 for each of the desired and necessary distributive fiber optic sensor cables. The fiber optic mechanical cable connections contained within the fiber box 10 permit various cable layouts to be selected and connected so as to utilize the optimum characteristics of the Rayleigh, Brillouin, and Raman analyzers selected for the site-specific requirements without limiting the characteristics of the special Brillouin/Rayleigh/Raman analyzer selected, thereby providing great operational flexibility. For example, one typical Rayleigh back-scattering laser analyzer has a spatial resolution of 1 mm and a maximum fiber length of 70 meters and a Brillouin laser analyzer has a spatial resolution of 2 mm and a maximum length limitation of 2 kilometers. A reconfigurable fiber optic sensor cable layout is required to take full advantage of both the Rayleigh and Brillouin and the special cases utilizing Raman back-scattering.

4.) Each of the fiber optic link cables proceeds to a fiber optic multiplexor (or fiber optic switch) 12.

5.) Alternatively the fiber optic cables could be linked to the control room by means of a single conduit 13.

6.) Assuming the operator positions the fiber optic multiplexor 12 on or near the generator frame 1, the laser distributive fiber optic sensor laser analyzer 14 could also then be positioned on the frame 1.

7.) Each of the distributive fiber optic sensor means described herein has different fiber-length limitations, which, in turn, are a function of the spatial resolution achievable by means of the distributive fiber optic sensor laser analyzer selected. Therefore, when the generator control room (not shown) is physically close to the electric generator 1, the operator may chose to locate the multiplexor 12 and laser analyzer 14 in the control room irrespective of the analysis method selected which would require use of the fiber optic conduit 13. Therefore, the decision concerning the location of the multiplexor 12 and laser analyzer 14 has to be considered as site specific and both locations for these two invention components should be considered as equal embodiments of the invention.

Figure 2:
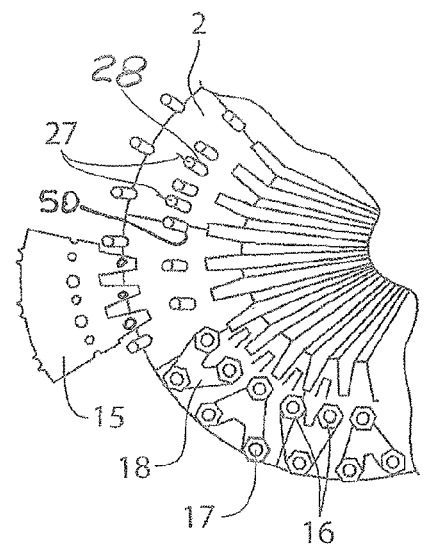
FIG. 2 illustrates partial end view of the generator of FIG. 1 and further illustrates additional special holes that can be added to the AC electric generator stator core iron laminations for the purpose of distributed fiber optic sensor temperature measurements using the fiber optic sensors.

FIG. 2 is an end view of the complete stack of electrical grade steel laminations 15 that are positioned in a circle (nine(9) per circumference) and longitudinally staggered (overlapped) to form the massive stator core 2 which consists of individual laminations 15 tightly held and clamped by through bolts 16 and building bolts 17 both equally spaced as shown.

Figure 3:
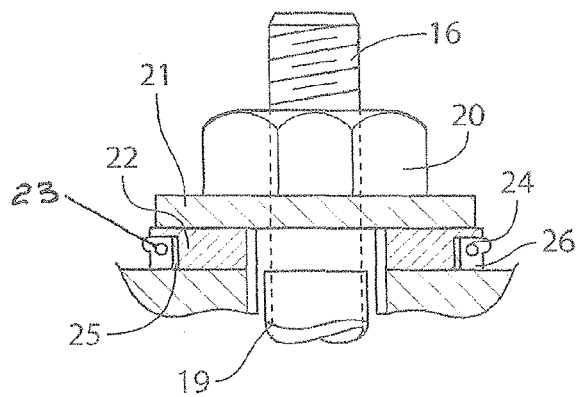
FIG. 3 illustrates a special attachment mechanism for the fiber Bragg grating installed on the through bolt insulating washer of the AC electric generator of for the purpose of preventing birefringence.
Figure 4:
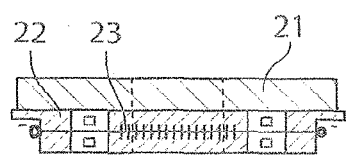
FIG. 4 illustrates a partial cross-sectional view of a fiber Bragg grating installed within a groove in the insulating fiberglass washer of a through bolt and nut arrangement employed in the AC electric generator of FIG. 1.
Figure 5:
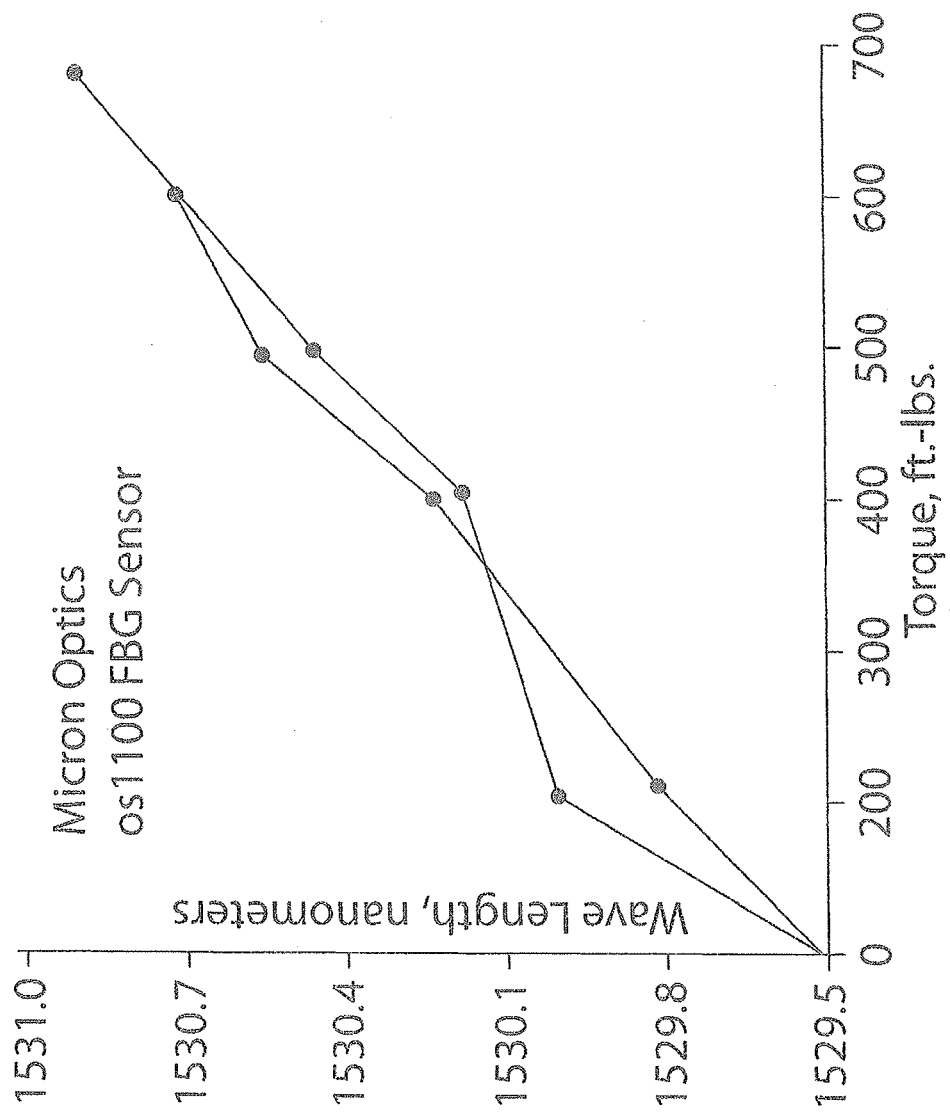
FIG. 5 illustrates Fiber Bragg grating wave length as a function of applied torque for an AC electric generator insulating through bolt fiber optic load sensing washer.

Now in a particular reference to FIGS. 3-4, the mechanical clamping force provided by through bolts 16 and building bolts 17 is spread over a given area by means of the core support plates 18. Examining the construction of the through bolt, FIG. 3 shows a stainless steel through bolt 16 which is threaded on bolt ends (one end only shown), which is insulated with (typically) Nomex insulation 19 in order to isolate the bolt voltage (approximately 1000 volts) from the stator core which is typically grounded to the frame 1 by means of grounded building bolts 17. The through bolt nut 20 when fully tightened loads stainless steel washer 21 which in turn transmits clamping load through the fiberglass insulating washer 22. A typical clamping force is between 50,000 and 80,000 pounds, which creates large hoop and compressive forces in the fiberglass washer 22. In order to measure this force the distributive fiber optic sensors 23 and 24 are proposed. As with all fiber optic sensors these are immune to electric voltage and magnetic field effects and can be safely attached to a fiberglass thin ring 25 by appropriate bonding means. The fiberglass ring 25 is lightly press fit to the fiberglass washer 22. As load is applied to the fiberglass washer 22 its diameter increases and thickness decreases and the fiberglass ring 25 expands and grows larger in diameter and circumference in direct proportion to the load. The fiberglass ring 25 also serves to eliminate compressive loads on the distributive fiber optic sensor 24 which would create birefringence in the response complicating the analysis. By eliminating compressive loads on the fiber optic sensor 24, commercially available fiber optic sensor laser analysis equipment can be used such as that supplied by Micron Optics which is designed to measure only stretch of wave length multiplexed fiber Bragg gratings. This equipment does not accurately respond when compressive loads are superimposed on lineal stretch of the fiber Bragg grating. The fiberglass ring 25 effectively shields the fiber Bragg grating from the large compressive loads which are present in the fiberglass washer 22, which in turn permits the simplified correlation between reflected wave length change as a function of applied through bolt load. Therefore fiber optic sensor 23 could be a standard fiber Bragg grating and sensor 24 could be either a fiber Bragg grating modified to act as a fiber optic thermocouple as supplied by Micron Optics or it could be a standard fiber Bragg grating contained within a small non-magnetic, non electrically conducting tube both protected from contamination by a non-contacting sealant, such as silicone 26. Both fiber optic sensors would be linked by a common fiber optic cable and two or three more such assemblies would be equally spaced around the circumference all on the same fiber optic cable, equally spaced around the generator circumference in FIG. 2. The fiber optic sensors would also be added to the building bolts and included on a common fiber optic cable allowing simultaneous measurement of through bolt and building bolt loads. Instead of bonding the fiber Bragg grating or fiber optic cable to fiberglass ring 25, the clamps and bolts shown in FIG. 3 could be alternatively used. By these alternative means the stator core tightness can be measured at any time, whether on-line, off-line, or under full load and assessment of suitable core tightness obtained periodically without the need for unit disassembly and use of hydraulic means. Reference is made to U.S. Pat. No. 5,973,317 which describes a similar fiber optic load measuring device. That invention by virtue of its construction would require careful analysis of the birefringence and it should be noted that it is not temperature compensated, which would make it unsuitable for the present invention. The invention described herein has been reduced to practice and a typical curve showing change in wave length for the fiber Bragg grating as a function of mechanical torque applied to the through bolt nut is shown in FIG. 5. Note also that FIG. 2 is a convenient view to show small holes 50 that can be added to new factory stator core electrical steel laminations and collinear support structures for the purpose of inserting small non-conducting, non-magnetic (plastic) tubes 28 which contain standard fiber optic cables 27 for the monitoring of operational stator core temperatures with an accuracy equivalent to the EL-CID and thermo-vision tests described above. The accuracy and spatial resolution, of course, depends on the distributive fiber optic sensing laser analyzer selected, Rayleigh, Brillouin, or Raman (temperature only). For a fiber optic sensing cable(s) 27 within a tube(s) 28 proceeding from one small lamination hole 50 to the next, strain would not be of interest, which would allow selection of the Raman distributive fiber optic sensing system for this special case, but the Rayleigh and Brillouin Frequency shift methods could also be used and selected based on what other generator components are selected for monitoring and diagnostics.

The embodiment described above is not the preferred embodiment but should be included for those operators of electric generators that are only interested in stator core tightness due to either past unit history or other factors beyond the scope of this invention. A more preferred embodiment is shown in FIGS. 6-7, in which the fiberglass washer 22 is bonded to stainless steel through bolt 16 and through bolt insulation 19 enabling deployment of a single Rayleigh backscattering or a Brillouin frequency shift distributive fiber optic sensor cable 27 as shown. It should be noted that the single distributive fiber optic cable traverses from one end of the through bolt within a small plastic tube 28 the tube having internal diameter to allow the fiber optic cable to freely expand and contract with temperature change. This tube 28 is installed under the outer layer of the through bolt Nomex insulation 19 and resides in close proximity to all the stator core electrical steel laminations 15 associated with a given through bolt 16 and can therefore, measure the temperature of these thousands of stator core laminations identifying "hot spots" within the stator core 2. Also, with this design the through bolt applied load is measured with the fiber optic sensor on one end of the bolt as shown in FIG. 6 and the bolt 16 is then tightened at the other end so as not to disturb the fiber optic sensor cabling. In practice a warning would be applied to the end with the fiber optic sensor cabling such as, "Do not apply torque to this end." Failure to heed this warning would certainly crack the bond between fiber glass washer 22 and through bolt 16 thereby breaking fiber optic cable 27 due to the large elongation which is applied to the through bolt in order to achieve the desired stator core tightness. Returning to the detailed construction, the plastic tube containing the distributive fiber optic cable 27 is bonded to the fiberglass ring 25 at segment A-B. Segment B-C is exposed fiber (no tube) that is bonded directly to fiberglass ring 25 in order to measure the hoop stress in the fiberglass ring 25. Section C-D is also bonded to the fiberglass ring 25 and at point D it enters a groove milled into fiberglass washer 22 of sufficient cross-section so that the tube is not loaded during through bolt tightening. From point D on the tube is contained under the top layer of through bolt Nomex insulation 19. It should be noted that the tube then continues to the other end of the through bolt in a general unspecified path which is not necessarily straight line, making a U-turn at the distal end, returning back on the generally opposite side of the bolt, crossing over the fiber at point A and going somewhat parallel to segment BC and then curving down to point E at which point it exits the sealant 26 (not shown for clarity). Section A-E is also used for temperature compensation. It should also be noted that sections C-D and A-E could encircle ring 25 for enhanced load measuring accuracy. Once through bolt assemblies are inserted into the stator laminations 15, the distributive fiber optic cables 27 would then be fusion welded together, which is the preferred method, or even linked together with mechanical fiber optic connectors. Measurements would then be made at zero load and in increments to full tightness It is estimated that with the Rayleigh back-scattering method, four through bolts could all be linked by the same cable, for the Brillouin method about 30 through bolts cold be attached to one distributive fiber optic sensor cable 27.

Figure 9:
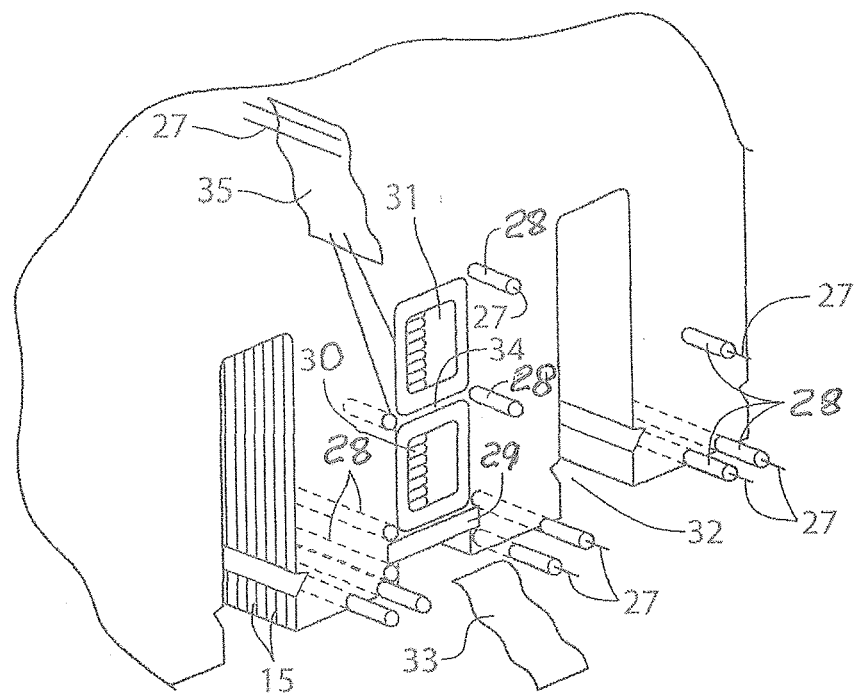
FIG. 9 is an end-view of the AC electric generator stator core slot portion showing top and bottom coils along with possible locations for fiber optic sensor and fiberglass shims containing these composite support tubes for the distributed optical sensing fiber.
Figure 10:
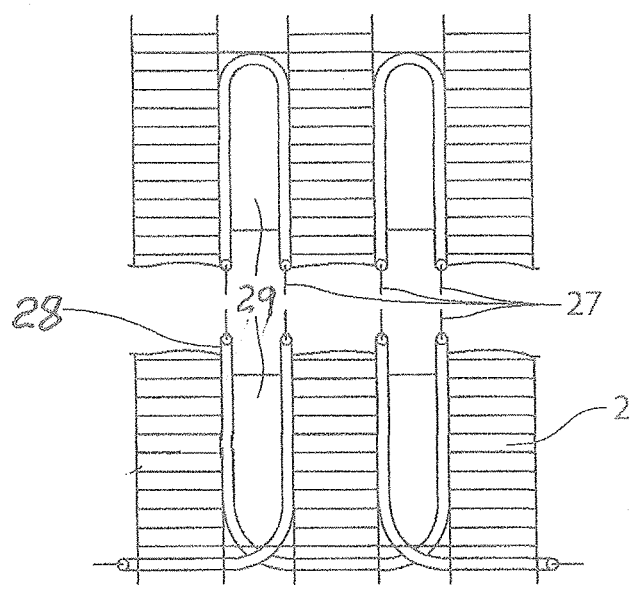
FIG. 10 shows one possible arrangement for a fully distributed fiber optic sensor when only the stator core wedges are accessible for modification.

FIGS. 9-10 identify some additional key electric generator components not previously numerically identified, to wit: stator wedge 29 which holds all stator core winding segments consisting of top coil segments 30 and bottom coils segments 31 tightly in the stator slots 32. Under each wedge 29 are a series of flat fiberglass shims (not shown for clarity) and a single fiberglass ripple spring 33, one ripple spring for each stator wedge 29. At assembly, the ripple spring 33 is wedged (compressed) to a nearly flat condition resulting in several hundred psi pressure initially exerted onto the top coil segments 30 through intermediate spacer 34 and onto the bottom coil segments 31. The intermediate spacer 34 may also contain RTD elements for measuring stator coil temperature. As noted below, shim 36 can be used as a substitute for the standard RTD element. Also semi-conducting side ripple springs 35 are installed between the sides of the top and bottom coil segments and one side only of the stator core slot 32. It is important to note that over years of operation, due to creep and relaxation of the spring and stator coil insulation, the ripple spring force degrades until pressure becomes low enough that the magnetic forces can cause the stator coil segments to start moving with respect to the stator core laminations, resulting in insulation abrasion followed by insulation failure and coil grounding. Therefore, knowledge of stator coil tightness is very useful information for those responsible for electric generator maintenance and continued safe operation.

Having identified key generator components another aspect of the invention can now be fully described. The flat shim not shown in FIG. 9 that is used in conjunction with the top coil ripple spring component is shown conceptually in FIGS. 11-12. These fiber glass shims range in thickness from 0.007 inches to 0.19 inches and are used to make up for the manufacturing tolerances between the coils stack height and the slot depth. Typically they are about four feet in length. Item 36 represents a typical fiberglass shim. For application to this invention the shim length would be increased to slightly more than the total stator core slot length, which for large machines can be about 25 feet in length. Shims 36 of this length can be either made in a special long press or constructed from segments joined together with lap joints. The means to monitor either on-line or off-line, the tightness of the stator coil segments within the stator core as well as the condition of the stator core steel lamination electrical resistance is done by means of special grooves 36a milled into long fiberglass shims 36. FIG. 10 also illustrates a special case of the invention in which stator core electrical steel lamination tooth tops are to be monitored without major disassembly. In this application a continuous distributive fiber optic sensor cable is installed in a special groove 36a milled into the stator wedge 29 thereby allowing the serpentine arrangement of the fiber optic cable to be bonded in this groove monitoring the tooth top temperatures during operation. This configuration of fiber would be well-suited to a stator tooth "hot spot" monitoring using Raman distributive fiber optic sensors, if only temperature were of interest, which, in this deployment might well be the cost-effective (but certainly not inclusive or even necessarily recommended) partial solution. This is not a preferred embodiment but would be a viable option for certain generator designs. Dense packed fiber Bragg gratings were first considered as the means to measure these two important parameters but the cost of writing the individual fiber Bragg gratings onto fiber optic cable in sufficient density to enable suitable measurements was not economically viable even though that approach could yield the required measurements. Test samples were then done to validate the use of Rayleigh back scattering and high spatial resolution version of the Brillouin method were tested and found to be viable and cost effective as well. For example, a meter of polyimide coated, low-bend loss, single mode fiber costs about $1.25, a tiny fraction of the cost of fiber Bragg gratings whether single or dense packed. The invention consists of special grooves added to the long shim which enable mechanical bending strains to be measured anywhere along the full length of the shim 36. These optical strain measurements are fully compensated for temperature as the stator coil segment in the stator slot varies in temperature from the cold end of the machine to the hot end and some units have zoned cooling which then requires further determination of the coils temperature within the zones in order to accurately measure the tightness of the coil segments within the stator slot portion of the stator core. Whatever method is used, Rayleigh back scattering or a version of Brillouin frequency shift, the part of the fiber that measures mechanical strain is carefully bonded to a special groove cut into the side of the fiberglass shim away from the top ripple spring 33. This is shown as the dotted line segment K-L in FIG. 11. Note that the groove has a radius bottom which gives the best possible bond between the shim 36 and the distribute fiber optic sensor cable 27. It is also important to note that the fiber optic cable is when properly bonded to the shim 36 slightly below the surface of said shim. This precludes the optical fiber from experiencing any transverse loading, which as noted above is an important factor in reducing the data by eliminating the effect of birefringence due to loading. This fact is absolutely a key feature of the one Brillouin method that uses polarizing maintaining fiber and the natural birefringence property of this type of fiber to separate the strain measurement from the temperature measurement. If the fiber were loaded transversely, this method would not be possible. That would also be the situation with the other methods described above. A series of small fiberglass pseudo-parabolically shaped shims 37A and 37 B are spaced on both sides of shim 36 such that their spacing equals the wave pitch of the fiberglass top ripple spring 33. The shims 37A on the top of shim 36 are one half wave pitch shifted with respect to shims 37B on the bottom. Also, the shims 37B shown underneath shim 36 have a relief 38 cut into them so they do not impose transverse loads onto the fiber optic distributive cable. The tops shims 37A do not require the special relief due to the thickness of shim 36. Both shims 37A and 37B can be applied in the proper position on 36 by coating each with contact adhesive. It should be noted that top coil ripple springs 33 have a range of spring rates from high to low as measured from the difference in their radial height from top to bottom. The ones with the largest radial deflection capability cannot be compressed totally flat without cracking and thereby degrading their useful function. For this condition it is recommended that top shims 37A not be used. Only bottom shims 37B would be employed. By this method shim 37B functions as a mechanical stop preventing over-compression of this particular widely-used style of top coil ripple spring 33. whatever the spring rate of the top coil ripple spring the curving shape of shims 37A, 37B and their radial thickness, should be matched to the top ripple spring that is used so as to minimize stress concentration in the optic fiber 27 and to make the spring rate of shim 36 consistent with that of the tip ripple spring 33. For example, the shape design of shims 37A and B should be such that when the top ripple spring is initially installed and compressed to the proper value, shim 37B should be such that the deflection of shim 36 is slightly less than the radial height of shim 37B. In any case, shims 27A and B can also be properly positioned on the thin adhesive plastic tape 40 as shown. The optical fiber than inters a groove that turns it to the outer edge of the shim where it then runs in a tiny groove at located at the neutral axis center of the shim. It is not bonded in this region M-N but is free to expand and contract as a function of local stator lamination "tooth temperature." This portion of the fiber is physically very close to the stator laminations and since the corners or all stator coils are rounded (See FIG. 9), this portion of the fiber senses only the tooth temperature. Section O-P functions identical to M-N and is constructed identical to section M-N. It is also important to note that the fiber is located on the neutral axis of shim 36 which, therefore, insures that this portion of the optical fiber experiences no significant bending strain induced by action of shims 37A and 37B on shim 36. Sections M-N and O-P would be covered with adhesive tape 39a such as Kapton tape to maintain the fibers in the grooves. Alternatively, small tube 28 could be bonded within the groove in order to contain the SM/PM fiber, which eliminates the need for adhesive tape 39a. Tube 28 could also be attached to shim 36 by other means such as a helical cord arrangement. Once the fiber reaches position P it continues on inside plastic tube 28 to the next shim 36 which would be an adjacent slot 32 in stator core 2. Starting at position Q proceeding to the far end of shim 36 to position R, etc. Tube 28 would be secured to end turn stator coil by suitable fiber glass banding tape, which would be a routine standard practice. The tube 28 would be banded on the side of the end turn stator coil to shield and protect it from damage. The tubing in this area could have a heavier wall as well to offer additional protection.

An additional feature shown in FIG. 11 concerns section S-T and U-V where the fiber leaves the side grooves and enters small plastic tubing contained within curving slots within shim 36. In these areas the temperature measured would be that of the stator coil ground-wall insulation, the same as is currently measured by the RTD segments. Any number of these special tubes within grooves can be added anywhere along the shim 36. Groove U-V is preferred as it does not subtract from measurement of tooth temperatures. Also, note that tube U-V and/or S-T may be located on either the top or bottom of shim 36, which would enable it to measure stator coil ground-wall temperatures of either the top or bottom coil ground-wall when shim 36 is located between top and bottom coils, for example. Should shim 36 be located between top and bottom coils is still performs the function of measuring stator coil tightness and all the required stator coil ground-wall and stator core electrical steel lamination slot temperatures required. Tests have shown that both the Rayleigh back scattering method and the Brillouin method based on birefringent polarizing maintaining fiber have sufficient spatial resolution to distinguish the temperatures in S-T or U-V from those measureable in the side groove attributable to stator core "tooth temperatures." It is also important to note that shims 36 could also be placed between top and bottom coils (Item 34 in FIG. 9) as well as at the bottom of slot 32 of FIG. 9. For these latter two instances, shims 37A and 37B could or could not be used. Shims 37A and 37B might not be used if they were part of shim 36 located on top of the top coil, or additional spring retention force/deflection could be obtained by locating shim 36 in both locations both with shims 36A and 26B. If shims 36A and 36B are not used shim 36 is not subject to bending with the result that the distributive fiber optic sensing cable would be used to measure only coil segment and stator core lamination temperatures in these two locations by means of either Rayleigh back scattering or Brillouin frequency shift analysis. By this means, the standard RTD measurement is no longer required having been replaced by the distributive fiber optic sensing cable, which also eliminates another grounding source with current means using the electrically conductive wires in the RTD's (resistance temperature detectors). A final observation about fiber sections Y and W is required. These sections are bonded to alternatively the top and bottom of shim 36, the transposition from top to bottom by means of the small slits shown so as to be of the same period and phase as the top ripple springs. By so doing all the fiber optic strain measurements for any given ripple spring are of the same sign, all positive or negative, which enables use of distributive fiber optic sensor systems with larger spatial resolution. By this means a single value of average strain can be obtained for each ripple spring if the spatial resolution of the fiber optic distributive laser analyzer is made equal to the axial length of the ripple spring.

Another attribute of the invention concerns possible application of U.S. Pat. No. 7,599,047, which is a special version of the Brillouin frequency shift in which temperature and strain are separated by using two single mode fibers of different index of refraction. Both fibers would be rigidly bonded to the fiberglass shim 36 and the ability to separate strain effects from temperature effects is completely dependent on the refractive index difference. At this writing this concept has not been tested, but it should remain a possibility as a way to ruggedize the shim 36. This would also permit the shim to be used in machines that are vacuum impregnated. In this later case shims 37A/37B would not be required as the top ripple spring is not used in this class of electric generators. For the birefringent version of the Brillouin analysis a minor modification could also be made to allow this version to be used with fully vacuum impregnated stator cores. In this version the small plastic tubes could also be used for the full length of grooves S-T and U-V eliminating the need for covers 39a. The ends of the rubes at positions S, T, U, and V could then be sealed thereby allowing full vacuum impregnation without filling the tubes 28 with resin which would destroy their temperature measuring ability.

Figure 13:
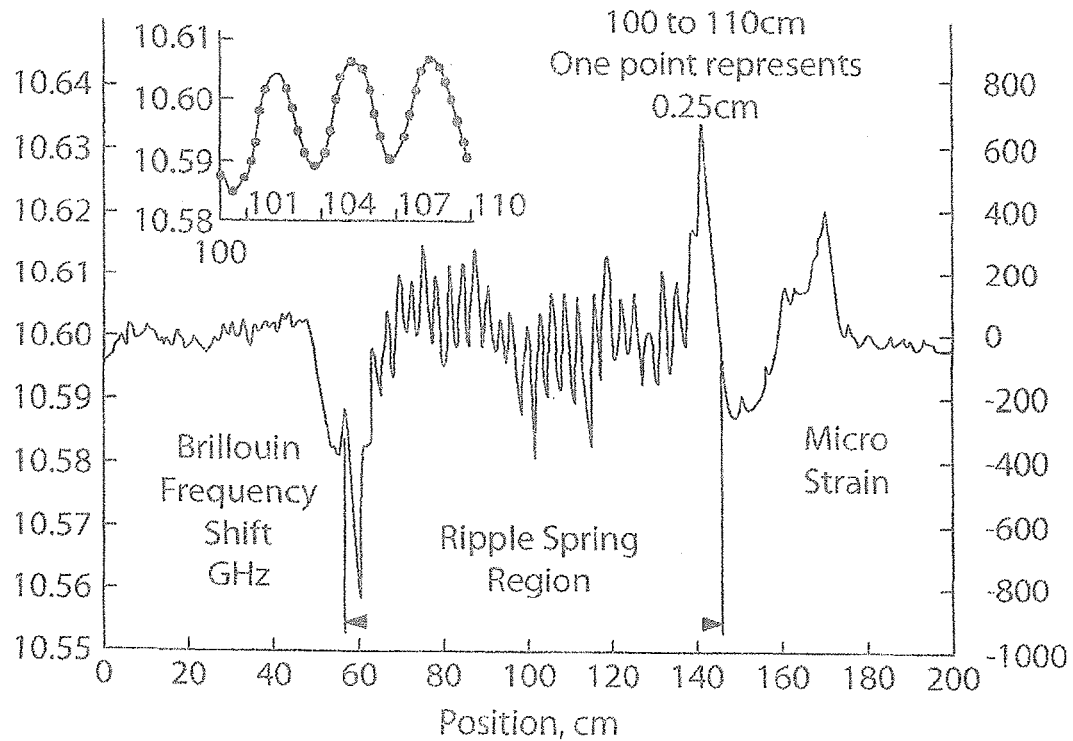
FIG. 13 illustrates one set of experimental results for AC electric generator modified stator core slot filler material instrumented with single mode optical sensing fiber and measured with the DPP-BOTDA method.
Figure 14:
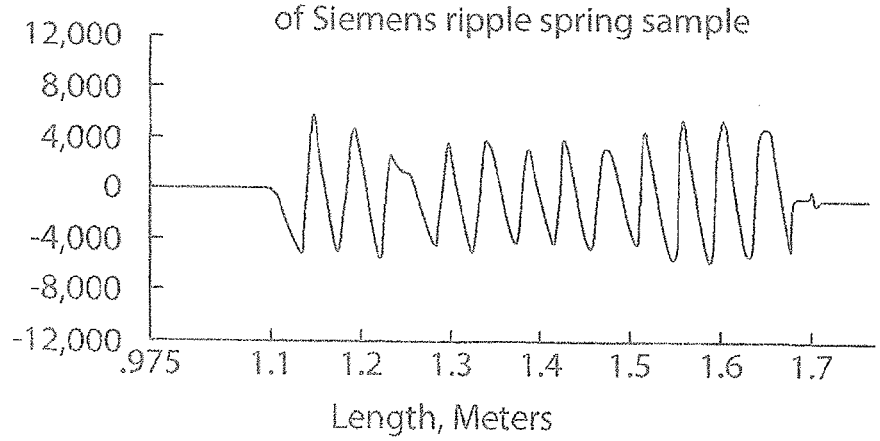
FIG. 14 illustrates another set of experimental results for AC generator modified stator core slot filler material instrumented with single mode optical sensing fiber and measured with Rayleigh back-scattering.

FIGS. 13-14 present experimental results of the invention using the Brillouin method of item 4 above, which was done by Professor Xiaoyi Bao of the University of Ottawa, Canada Physics Department and is the first time measurement of an electric generator top coil ripple spring strain as a function of the Brillouin frequency shift using the Differential Pulsed Pair Domain Analysis (FIG. 13). A similar curve was obtained by means of the Luna Innovations Rayleigh FOS DSS 4600 instrument (FIG. 14).

Figure 16:
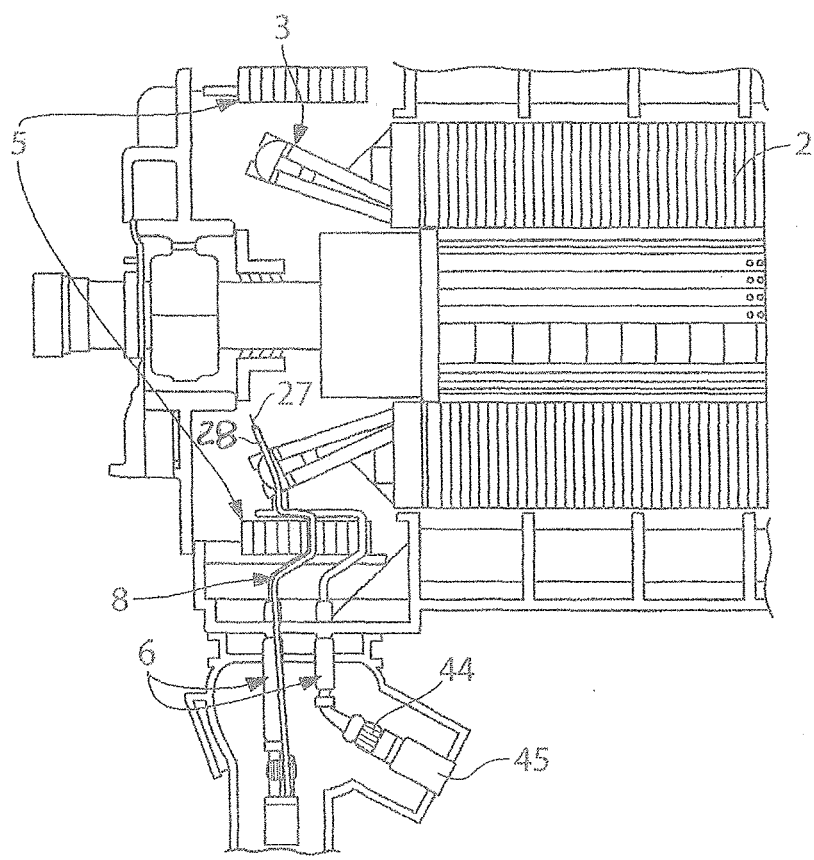
FIG. 16 is a cross-sectional view of an AC electric generator depicting the end region and main lead region and one possible routing pattern of the fiber optic sensor for a fully distributed fiber optic sensing.

Another aspect of the invention is made in reference to FIG. 16 and the small plastic tubes shown in FIG. 8. As mentioned previously the plastic tubing is both high temperature and high strength, PEEK being but one possible material. Polyimide is another possibility. All of these choices can be obtained in any cross-section desirable as well as a complete range of inside and outside diameters, which adds further flexibility. An important aspect of the invention is the design of the couplings 28*a*. In reference to FIG. 8, the coupling 28*a* can have a full range of length L from long to short as can gap G connecting tubing sections 28. Also, couplings 28*a* are sized so as to be moveable with respect to tubing 28. Couplings 28*a* would be initially held to tubing 28 with small pieces of adhesive tape 39.

Figure 15:
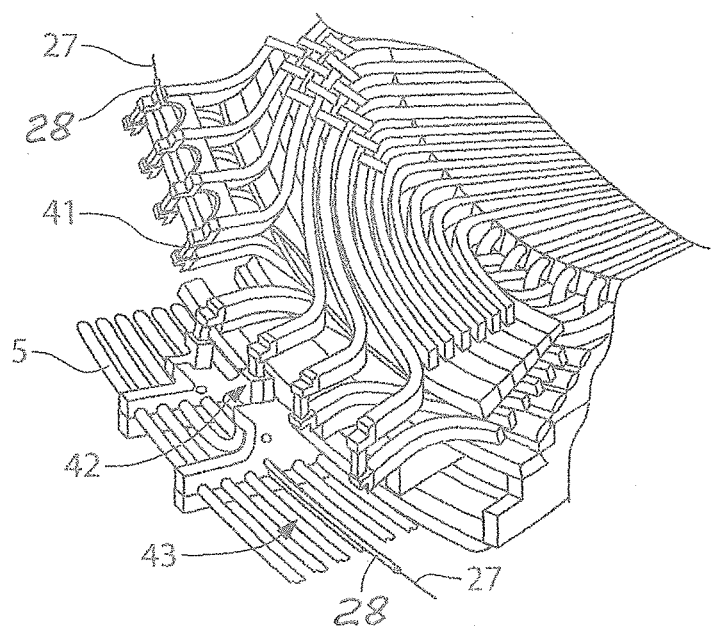
FIG. 15 illustrates the AC electric generator end region suitable for use with the fiber optic sensor for a fully distributed fiber optic sensing.

During assembly in the generator these pieces of tape would be removed thereby allowing the overall length of tubing 28 to be changed to either longer or shorter and/or the couplings can be moved so as to expose sections of distributive fiber optic cable 27 which enables said fiber to be directly bonded to generator components for the purpose of localized strain measurement. In addition, when coupling 28*a* is moved further onto tubing 28, a small tubing cutter can be used to cut through only coupling 28*a* without the possibility of damage to the distributive fiber optic cable 27 contained within tubing 28 effectively increasing the flexibility of positioning the location of exposed bondable sections of fiber 27. Several possibilities are illustrated in FIG. 15. The first example concerns series electric generator series connections 41. An illustrative section of tubing 28 is shown in direct contact with one side of a series connection, looping around the bottom, and then proceeding up the opposite side of the series connection onto a nearby support ring from which tubing 28 containing fiber 27 proceeds to the next series connection, etc. Were the connection a phase connection 42, tubing 28 could then proceed to monitor the local temperature of said phase connection 28 and proceed on to monitor parallel ring temperatures and in particular the temperatures of brazed parallel ring copper connectors 43. From the parallel ring segments the tubing 28 could also continue on to the main lead 6 and flexible connectors 44 or possibly even main bushings 45. At all of these locations the tubing would be both bonded and banded to the various components utilizing standard winding techniques. As noted above all couplings 28*a*, tubing sections 28 can be sealed with the appropriate adhesive rendering the inner diameters "air tight" for their full expanse by appropriate leak testing means. This provides the added capability of distributive fiber 27 contained within tubing 28 and tubing couplings 28*a* to be fully applicable to vacuum impregnated electric generators. The possibility of using the dual index of refraction method, one fiber for strain, and a second of different refractive index, both encased in suitable high temperature material is described above. And, again certain conditions and generator history might recommended that the Ramon distributive fiber optic multi-mode cable be used within the special tube 28 when only temperatures are of interest.

What is claimed is:

1. In combination with a generator of electric energy including a frame, a stator mounted stationary within said frame and a rotor mounted for rotation within said stator, said stator including a stack of laminations and ring shaped coil windings clamped in abutting engagement with each other with a plurality of threaded bolt and nut fasteners with an electrically non-conducting non-magnetic compression member positioned between each nut fastener and end of said stator, an apparatus comprising:

(a) a peripheral groove disposed concentric with at least one of said plurality of bolt fasteners;
    (b) at least one fiber optic cable having a first portion thereof disposed within and encircling said peripheral groove and additional two portions extending in radially opposite directions external to said groove; and
    (c) wherein said apparatus is configured to measure at least one of Rayleigh back-scattering, Brillouin frequency shift and Raman distributive characteristics of an optical signal traveling through said at least one fiber optic cable.

2. The combination of claim 1, wherein said apparatus includes a first sensor configured to measure strain and a second sensor configured to measure temperature.

3. The combination, according to claim 2, wherein said first sensor includes a section of said first portion of said fiber optic cable bonded directly to said peripheral groove.

4. The combination, according to claim 2, wherein said second sensor includes an electrically non-conducting tubular member and a section of said first portion of said fiber optic cable encased within said electrically non-conducting tubular member.

5. The combination of claim 2, wherein said peripheral groove is disposed within a ring attached to an exterior edge surface of said insulating washer.

6. The combination of claim 2, wherein said additional two portions extend along a length of said at least one of said plurality of bolt fasteners.

7. The combination of claim 1, wherein said apparatus is configured to measure a combination of said Rayleigh back-scattering and said Brillouin frequency shift and wherein Rayleigh back-scattering measurement is adapted to improve accuracy of Brillouin frequency shift measurement.

8. The combination of claim 1, further including a sealable enclosure configured to receive ends of said at least one fiber optic cable.

9. The combination of claim 8, wherein said sealable enclosure is further configured to receive a portion of said at least one fiber optic cable mediate ends thereof.

10. The combination of claim 1, further including a tubular member encasing said at least one fiber optic cable.

11. The combination of claim 10, wherein said tubular member is configured to expose a section of said at least one fiber optic cable and wherein said apparatus further includes a tubular coupling having inner diameter thereof sized so that said coupling is configured for movement on an exterior surface of said tubular member and having a length thereof sized larger than a length of said exposed section.

12. The combination of claim 1, wherein said apparatus is configured to measure said Rayleigh back-scattering upon a break in said at least one fiber optic cable.

13. In combination with a generator of electric energy including a frame, a stator mounted stationary within said frame, a rotor mounted for rotation within said stator, a plurality of wedges and a plurality of ripple springs disposed in abutting engagement with each other, an apparatus comprising at least one fiber optic cable, at least one shim manufactured from an electrically non-conductive material, said at least one shim having a pair of longitudinal edge grooves and another groove formed in one surface thereof, and wherein said at least one fiber optic cable is positioned within each of said pair of longitudinal edge grooves and said another groove.

14. The combination of claim 13, wherein said at least one shim is positioned between stator coils.

15. In combination with a generator of electric energy including a frame, a stator mounted stationary within said frame, a rotor mounted for rotation within said stator, a wedge and a ripple spring disposed in abutting engagement with said wedge, an apparatus comprising:

(a) at least one fiber optic cable;

(b) a first shim manufactured from an electrically non-conductive material, said shim having a pair of longitudinal edge grooves and another groove formed in one surface thereof, wherein said at least one fiber optic cable is positioned within each of said pair of longitudinal edge grooves and said another groove;

(c) a first plurality of second shims positioned in a spaced apart relationship with each other on said one surface of said first shim;

(d) a second plurality of said second shims positioned in a spaced apart relationship with each other on an opposite surface of said first shim; and (e) a groove defined in each of said first plurality of second shims in general alignment with said groove formed in said one surface of said first shim.

16. In combination with a generator of electric energy including a frame, a stator core mounted stationary within said frame and having a stack of ring shaped coils windings clamped in abutting engagement with each other with a plurality of threaded bolt and nut fasteners with an insulating washer positioned between each nut fastener and end of said stator core, and a rotor mounted for rotation within a frame, an apparatus for monitoring at least one of mechanical and temperature parameter of said generator, said apparatus comprising:

(a) a peripheral groove disposed concentric with longitudinal axis of at least one of said plurality of bolt fasteners;

(b) a fiber optic cable having a first portion thereof disposed within and encircling said peripheral groove and additional two portions extending in radially opposite directions external to said peripheral groove; and (c) means for measuring a combination of a strain and temperature in said first portion.

17. The combination of claim 16, wherein said means for measuring said combination of said strain and temperature in said first portion includes first and second sensors.

18. The combination, according to claim 17, wherein said first sensor includes a fiber Bragg grating.

19. The combination, according to claim 17, wherein said first sensor includes a section of said first portion of said fiber optic cable bonded directly to said peripheral groove and means for measuring at least one of Rayleigh back-scattering, Brillouin frequency shift and Raman distributive characteristics of an optical signal traveling through said at least one fiber optic cable.

20. The combination, according to claim 17, wherein said second sensor includes an electrically non-conducting tubular member and a fiber Bragg grating disposed within said electrically non-conducting tubular member.

21. The combination, according to claim 17, wherein said second sensor includes a fiber optic thermocouple.

22. The combination, according to claim 17, wherein said second sensor includes an electrically non conducting tubular member, a section of said first portion of said fiber optic cable disposed within said electrically non conducting tubular member and means for measuring at least one of Rayleigh back-scattering, Brillouin frequency shift and Raman distributive characteristics of an optical signal traveling through said at least one fiber optic cable.

23. The combination of claim 16, wherein said peripheral groove is disposed within a ring attached to an exterior edge surface of said insulating washer.

24. The combination of claim 16, wherein said additional two portions extend along a length of said at least one of said plurality of bolt fasteners.

25. In combination with a generator of electric energy including a frame, a stator core mounted stationary within said frame and having a stack of ring shaped coils windings clamped in abutting engagement with each other with a plurality of threaded bolt and nut fasteners within an insulating washer positioned between each nut fastener and end of said stator core, and a rotor mounted for rotation within a frame, an apparatus for measuring a clamping load acting onto said stack, said apparatus comprising:

(a) a ring disposed on an exterior edge surface of at least one insulating washer;

(b) a peripheral groove defined within a thickness of said ring in open communication with an edge surface thereof;

(c) a fiber optic cable having a first portion thereof disposed within and encircling said peripheral groove and additional two portions extending in radially opposite directions external to said ring;

(d) a first sensor configured to sense strain in said insulating washer; and (e) a second sensor configured to sense temperature in said insulating washer.

26. A method for monitoring at least one of a mechanical and a temperature parameter of a generator of electric energy including a frame, a stator mounted stationary within said frame and a rotor mounted for rotation within said stator, said stator including a stack of laminations and ring shaped coil windings clamped in abutting engagement with each other with a plurality of threaded bolt and nut fasteners with an electrically non-conducting non-magnetic compression member positioned between each nut fastener and end of said stator, said method comprising the steps of:

(a) providing at least one fiber optic cable;

(b) proving peripheral groove disposed concentric with at least one of said plurality of bolt fasteners;

(c) encircling, with a first portion of said at least one fiber optic cable, said peripheral groove;

(d) extending additional two portions of said at least one in radially opposite directions external to said groove; and (e) measuring at least one of Rayleigh back-scattering, Brillouin frequency shift and Raman distributive characteristics of an optical signal traveling through said at least one fiber optic cable.

27. The method of claim 26, wherein said step (b) include the steps of positioning said each fiber optic cable in close proximity to a stator wedge.

28. The method of claim 26, wherein said step (c) includes the step of measuring optical strain, the step of measuring temperature and the step of compensating an optical strain measurement with a temperature measurement.

29. The method of claim 26, wherein said method includes the step of providing plurality of tubular members and the step of inserting at least a portion of each fiber optic cable into a tubular member prior to mounting said each fiber optic cable in step (b).

30. The method of claim 26, wherein said method includes the step of isolating a portion of at least one fiber optic cable from mechanical strain.

31. In combination with a threaded fastener having a stem and a head at one end of said stem, an apparatus for monitoring at least one of a mechanical and temperature parameter of a device employing said threaded fastener, said apparatus comprising:
- (a) a fiber optic cable;
- (b) a peripheral groove disposed concentric with axis of said stem, said at least one fiber optic cable having a first portion thereof disposed within and encircling said peripheral groove and additional two portions extending in radially opposite directions external to said peripheral groove;
- (c) whereby a diameter of said peripheral groove increases in circumference due to force applied by the fastener onto said peripheral grove; and
- (d) wherein said apparatus is configured, in response to said circumference increase, to measure at least one of Rayleigh back-scattering, Brillouin frequency shift and Raman distributive characteristics of an optical signal traveling through said fiber optic cable.

32. A sensor comprising:
- (a) a fiber optic cable;
- (b) a disk shaped member manufactured from a compressive material and configured to receive said fiber optic cable within a thickness thereof and further configured to receive the fastener through said thickness;
- (c) wherein said disk shaped member being responsive to a force applied by the fastener to change an optical property of said fiber optic cable; and
- (d) wherein said sensor is configured to at least one of detect and measure compressive stress generated by the force applied by the fastener.

33. The sensor of claim 32, wherein said disk shaped member defines a peripheral groove in an exterior edge thereof and wherein said fiber optic cable is at least partially disposed within said peripheral groove.

34. In combination with a generator of electric energy including a frame, a stator mounted stationary within said frame, a rotor mounted for rotation within said stator, an apparatus comprising:
- (a) a plurality of apertures formed through a stack of laminations of said stator along length thereof;
- (b) a plurality of fiber optic cables, wherein each fiber optic cable is disposed within a respective aperture; and
- (c) arrangement configured to measure at least one of Rayleigh back-scattering, Brillouin frequency shift and Raman distributive characteristics of an optical signal traveling through each fiber optic cable.

35. A generator of electric energy comprising: a frame; said frame defining a pair of end regions, one of said pair of end regions including series, phase, parallel ring, main lead and flexible connections to said generator and the other one of said pair of end regions including said series connections; a stator mounted stationary within said frame between said pair of end region, said stator including a stack of laminations and ring shaped coil windings clamped in abutting engagement with each other with a plurality of threaded bolt and nut fasteners and with an electrically non-conducting non-magnetic compression member positioned between each nut fastener and end of said stator;
- one or more fiber optic cables including a sleeve and optical fiber disposed within said sleeve, said one or more fiber optic cables disposed within at least one of said series, phase, parallel ring, main lead and flexible connections; and
- an arrangement configured to measure at least one of Rayleigh back-scattering, Brillouin frequency shift and Raman distributive characteristics of an optical signal traveling through said optical fiber.

36. The combination of claim 35, wherein said one or more fiber optic cables are mounted within parallel ring connections.

37. The combination of claim 36, wherein said one or more fiber optic cables is configured to measure and/or monitor a local temperature of said parallel ring connections.

38. The combination of claim 35, wherein said one or more fiber optic cables are disposed in a direct contact with one side of said series connections.

39. The combination of claim 35, wherein said one or more fiber optic cables is disposed within said phase connection and configured to measure and/or monitor a local temperature of said phase connection.

40. A method for monitoring at least one of a mechanical and a temperature parameter of a generator of electric energy including a frame a stator core mounted stationary within said frame, a rotor mounted for rotation within said stator, a wedge and a ripple spring disposed in abutting engagement with said wedge, said method comprising the steps of:
- (a) providing a first shim manufactured from an electrically non-conductive material, said first shim having a pair of longitudinal edge grooves and another groove formed in one surface thereof;
- (b) positioning at least one fiber optic cable within each of said pair of longitudinal edge grooves and said another groove;
- (c) positioning a first plurality of second shims positioned in a spaced apart relationship with each other on said one surface of said first shim;
- (d) providing a groove in each of said first plurality of second shims in general alignment with said groove formed in said one surface of said first shim;
- (e) positioning a second plurality of said second shims in a spaced apart relationship with each other on an opposite surface of said first shim; and
- (f) positioning said first shim and said first and second pluralities of said second shims within a slot in said stator core; and
- (g) measuring at least one of Rayleigh back-scattering, Brillouin frequency shift and Raman distributive characteristics of an optical signal traveling through said at least one fiber optic cable.

* * * * *

UNITED STATES PATENT AND TRADEMARK OFFICE
CERTIFICATE OF CORRECTION

PATENT NO. : 8,520,986 B2  
APPLICATION NO. : 13/065842  
DATED : August 27, 2013  
INVENTOR(S) : George F. Dailey Page 1 of 1

It is certified that error appears in the above-identified patent and that said Letters Patent is hereby corrected as shown below:

On the title page, item (73) assignee: should read --Innovative Diagnostic Systems, Inc.--

Signed and Sealed this  
Fifth Day of January, 2016

Michelle K. Lee  
*Director of the United States Patent and Trademark Office*

UNITED STATES PATENT AND TRADEMARK OFFICE
CERTIFICATE OF CORRECTION

PATENT NO. : 8,520,986 B2  
APPLICATION NO. : 13/065842  
DATED : August 27, 2013  
INVENTOR(S) : George F. Dailey Page 1 of 1

It is certified that error appears in the above-identified patent and that said Letters Patent is hereby corrected as shown below:

On the title page, item (76) should read item --(75)--

On the title page, item (73) assignee: should read --Innovative Diagnostic Systems, Inc.--

This certificate supersedes the Certificate of Correction issued January 5, 2016.

Signed and Sealed this
Twenty-second Day of March, 2016

Michelle K. Lee
*Director of the United States Patent and Trademark Office*